US012807890B2

(12) United States Patent
Jia et al.

(10) Patent No.: US 12,807,890 B2
(45) Date of Patent: Nov. 24, 2026

(54) HIGH ACTIVITY SECOND STAGE NAPHTHA HYDROCRACKING CATALYST

(71) Applicant: Chevron U.S.A. Inc., San Ramon, CA (US)

(72) Inventors: Jifei Jia, Hercules, CA (US); Bi-Zeng Zhan, Albany, CA (US); Wai Seung William Louie, Brooklyn, NY (US); Arun Arora, Edison, NJ (US); Jay Parekh, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/006,495

(22) PCT Filed: Jul. 23, 2021

(86) PCT No.: PCT/US2021/042950
§ 371 (c)(1),
(2) Date: Jan. 23, 2023

(87) PCT Pub. No.: WO2022/026318
PCT Pub. Date: Feb. 3, 2022

(65) Prior Publication Data

US 2023/0272291 A1 Aug. 31, 2023

Related U.S. Application Data

(60) Provisional application No. 63/057,813, filed on Jul. 28, 2020.

(51) Int. Cl.

| | |
|---|---|
| ***C10G 65/10*** | (2006.01) |
| ***B01J 21/04*** | (2006.01) |
| ***B01J 21/12*** | (2006.01) |
| ***B01J 29/16*** | (2006.01) |
| ***B01J 35/00*** | (2024.01) |
| ***B01J 37/02*** | (2006.01) |
| ***B01J 37/04*** | (2006.01) |
| ***B01J 37/08*** | (2006.01) |

(52) U.S. Cl.
CPC .............. *C10G 65/10* (2013.01); *B01J 21/04* (2013.01); *B01J 21/12* (2013.01); *B01J 29/166* (2013.01); *B01J 35/19* (2024.01); *B01J 37/0203* (2013.01); *B01J 37/0213* (2013.01); *B01J 37/0236* (2013.01); *B01J 37/04* (2013.01); *B01J 37/08* (2013.01)

(58) Field of Classification Search
CPC .... B01J 29/7815; B01J 29/80; B01J 37/0018; B01J 37/0201; B01J 21/12; B01J 29/7007; B01J 21/04; B01J 23/85; B01J 2029/062; C10G 45/54; C10G 47/20
See application file for complete search history.

(56) References Cited

U.S. PATENT DOCUMENTS

| | | | | |
|---|---|---|---|---|
| 10,183,282 B2 | | 1/2019 | Jia | |
| 10,183,286 B2 | | 1/2019 | Jia | |
| 2002/0094931 A1 | * | 7/2002 | Wang | B01J 29/08 502/63 |
| 2009/0045100 A1 | * | 2/2009 | Yoon | C10G 65/10 208/59 |
| 2014/0367311 A1 | | 12/2014 | Yu | |
| 2015/0306583 A1 | * | 10/2015 | Zhang | B01J 21/12 502/66 |
| 2016/0296922 A1 | | 10/2016 | Zhang | |
| 2017/0043328 A1 | * | 2/2017 | Zhang | B01J 29/084 |
| 2017/0043329 A1 | | 2/2017 | Zhang | |
| 2018/0361366 A1 | * | 12/2018 | Zhang | B01J 37/08 |

FOREIGN PATENT DOCUMENTS

| | | | | | |
|---|---|---|---|---|---|
| CA | 2651741 A1 | * | 11/2007 | | C10G 69/04 |
| JP | 2017518171 A | | 7/2017 | | |
| JP | 2018529509 A | | 10/2018 | | |
| KR | 20180040603 A | | 4/2018 | | |

OTHER PUBLICATIONS

Daniell et al. "Enhanced surface acidity in mixed alumina-silicas: a low-temperature FTIR study." Applied Catalysis A: General 196.2 (2000): 247-260.
Group notation revised in periodic table, Chemical and Engineering News, vol. 63, No. 5, 1985, p. 26-27.
IUPAC Periodic Table of Elements, Jun. 2007, URL: https://iupac.org/wp-content/uploads/2018/02/IUPAC_Periodic_Table-22Jun07b.pdf, 01 page.
PCT International Search report mailed on Nov. 15, 2021 issued in Application No. PCT/US2021/042950, filed on Jul. 23, 2021, 9 pages.

* cited by examiner

*Primary Examiner* — Prem C Singh
*Assistant Examiner* — Juan C Valencia
(74) *Attorney, Agent, or Firm* — Mark Warzel

(57) ABSTRACT

Provided is a novel catalyst for use in the second stage of a two-stage hydrocracking process. The present process comprises hydrocracking a hydrocarbon feed in a first stage. The catalyst in the first stage is a conventional hydrocracking catalyst. The product from the first stage can then be transferred to a second hydrocracking stage. The catalyst used in the second stage of the present hydrocracking process comprises a base impregnated with metals from Group 6 and Groups 8 through 10 of the Periodic Table, and an organic acid. The base of the catalyst used in the present second hydrocracking stage comprises alumina, an amorphous silica-alumina (ASA) material, and a USY zeolite. Improved naphtha production is achieved.

23 Claims, No Drawings

HIGH ACTIVITY SECOND STAGE NAPHTHA HYDROCRACKING CATALYST

CROSS REFERENCE TO RELATED APPLICATIONS

This application is the national stage application of International Appl. No. PCT/US21/042950, filed on Jul. 23, 2021, and is related to, and claims priority benefit from U.S. Provisional Patent Appl. Ser. No. 63/057,813, filed on Jul. 28, 2020, entitled "HIGH ACTIVITY SECOND STAGE NAPHTHA HYDROCRACKING CATALYST", the disclosures of which are herein incorporated by reference in their entirety.

BACKGROUND

Catalytic hydroprocessing refers to petroleum refining processes in which a carbonaceous feedstock is brought into contact with hydrogen and a catalyst, at a higher temperature and pressure, for the purpose of removing undesirable impurities and/or converting the feedstock to an improved product. Examples of hydroprocessing processes include hydrotreating, hydrodemetallization, hydrocracking (HCR) and hydroisomerization processes.

A hydroprocessing catalyst typically consists of one or more metals deposited on a support or carrier consisting of an amorphous oxide and/or a crystalline microporous material (e.g., a zeolite). The selection of the support and metals depends upon the particular hydroprocessing process for which the catalyst is employed.

Hydrocracking is a specific catalytic chemical process used in petroleum refineries for converting the high-boiling constituent hydrocarbons in petroleum crude oils to more valuable lower-boiling products such as gasoline, kerosene, jet fuel and diesel oil. The process takes place in a hydrogen-rich atmosphere at elevated temperatures (500-800° F.) and pressures (500-3000 psi).

The significant economic utility of the hydrocracking process has resulted in a large effort devoted to the improvement of the process and to the development of better catalysts for the use in the process.

A commercial hydrocracking process typically include two sections, first stage hydrocracking and second stage hydrocracking. A major difference between the first and second stage hydrocracking reactor reaction environments lies in the very low concentrations of ammonia and hydrogen sulfide in the second stage. The first stage reaction environment is rich in both ammonia and hydrogen sulfide generated by hydrodenitrogenation and hydrodesulfurization of the feed. The feed for the second stage hydrocracking is typically the unconverted oil (UCO) from the first stage hydrocracking.

The current generation second stage hydrocracking catalyst for max naphtha has been performing well with feedstocks having an EBP lower than 850° F. In the refining industry, the second stage feedstocks are becoming heavier. The max naphtha second stage hydrocracking catalyst often needs to convert a heavy second stage feed with EBP higher than 1000° F. The current generation catalysts are no longer as suitable. There is a strong need to develop a better second stage hydrocracking catalyst that can convert heavier feeds to naphtha with greater selectivity, and hence better yields.

SUMMARY

It has been discovered that when utilizing the novel catalyst of the present process in the second stage of a two-stage hydrocracking process improved naphtha production can be achieved. The process comprises hydrocracking or hydroprocessing a hydrocarbon feed in a first stage. The catalyst in the first stage can be any suitable conventional hydrocracking or hydroprocessing catalyst. The product from the first stage can then be transferred to the second stage hydrocracking. The catalyst used in the second stage of the present hydrocracking process comprises a base impregnated with metals selected from Group 6 and Groups 8 through 10 of the Periodic Table. An organic acid such as citric acid is also impregnated into the base. The base of the catalyst used in the present second hydrocracking stage comprises alumina, an amorphous silica-alumina (ASA) material, and a USY zeolite.

Among other factors, it has been discovered that the use of the present catalyst in the second hydrocracking stage provides numerous advantages. The catalyst system of the second stage results in improved yields and selectivity in desired naphtha products.

DESCRIPTION OF PREFERRED EMBODIMENTS

The present processes relate to hydrocracking a hydrocarbon feed using two stages. Commercial hydrocracking processes typically include two sections, first stage hydrocracking and second stage hydrocracking. A major difference between the first and second stage in hydrocracking reactor reaction environments lies in the very low concentrations of ammonia and hydrogen sulfide in the second stage. The first stage reaction environment is rich in both ammonia and hydrogen sulfide generated by hydrodenitrogenation and hydrodesulfurization of the feed. The feed for second stage hydrocracking is typically the unconverted oil (UCO) from the first stage hydrocracking. The UCO can comprise a paraffin content, as measured by mass spectrometry, of at least 30 vol. %, and/or a H content, as measured by H NMR, of at least 13.5% wt. %. The present catalyst is designed for second stage hydrocracking.

The process and catalyst are designed to improve the yields and conversion of naphtha (180-347° F.). While the first stage hydrocracking employs a conventional hydrocracking catalyst, the key is in the second stage catalyst. The second stage employs a particular catalyst comprising a base comprised of alumina, an amorphous silica-aluminate (ASA), and a USY zeolite. The base is impregnated with catalytic metals, selected from Group 6 and Groups 8 through 10 of the Periodic Table, preferably Nickel (Ni) and Tungsten (W), as well as an organic acid. The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985). The base must also be impregnated with an organic acid, for example citric acid, in the preparation of the catalyst. The combination of the organic acid with the metals and the present base components has been found to provide improved selectivity for naphtha in a second stage hydrocracking.

Thus, provided are supported multi-metallic catalysts for use in a second stage hydrocracking application, as well as a method for preparing such catalysts. The base contains alumina, Y zeolite, and an amorphous silica-alumina. The catalysts are prepared from a catalyst precursor comprised of at least one Group VIB metal, at least one Group VIII metal and an organic acid.

The base of the catalyst can comprise from about 0.1 to about 40 wt. % alumina base, based on the dry weight of the base, or in another embodiment from about 20 to about 30 wt. % alumina. About 25 wt. % alumina can be used in another embodiment. The base of the catalyst can also comprise from about 0.1 to about 40 wt. % ASA, based on the dry weight of the base, or in another embodiment from about 15 to about 30 wt. % ASA. The Y zeolite can comprise from 20 to about 85 wt. % of the base based on the dry weight of the base. In another embodiment, the Y zeolite can comprise from about 30 to about 60 wt. %, or in another embodiment, from about 40 to about 60 wt. % of the base.

The alumina can be any alumina known for use in a catalyst base. For example, the alumina can be γ-alumina, η-alumina, θ-alumina, δ-alumina, χ-alumina, or a mixture thereof.

The ASA of the catalyst support is an amorphous silica-alumina material in which the mean mesopore diameter is generally between 70 Å and 130 Å.

In one embodiment, the amorphous silica-alumina material contains $SiO_2$ in an amount of 10 to 70 wt. % of the bulk dry weight of the carrier as determined by ICP elemental analysis, a BET surface area of between 450 and 550 $m^2/g$ and a total pore volume of between 0.95 and 1.50 mL/g.

In another embodiment, the catalyst support comprises an amorphous silica-alumina material containing $SiO_2$ in an amount of 10 to 70 wt. % of the bulk dry weight of the carrier as determined by ICP elemental analysis, a BET surface area of between 450 and 550 $m^2/g$, a total pore volume of between 0.95 and 1.55 mL/g, and a mean mesopore diameter is between 70 Å and 130 Å.

In another embodiment, the catalyst support is a highly homogeneous amorphous silica-alumina material having a surface to bulk silica to alumina ratio (S/B ratio) of 0.7 to 1.3, and a crystalline alumina phase present in an amount no more than about 10 wt. %.

$$S/B\ \text{Ratio} = \frac{(\text{Si/Al atomic ratio of the surface area measured by } XPS)}{\left(\begin{array}{c}\text{Si/Al atomic ratio of the bulk}\\ \text{measured by elemental analysis}\end{array}\right)}$$

To determine the S/B ratio, the Si/Al atomic ratio of the silica-alumina surface is measured using x-ray photoelectron spectroscopy (XPS). XPS is also known as electron spectroscopy for chemical analysis (ESCA). Since the penetration depth of XPS is less than 50 Å, the Si/Al atomic ratio measured by XPS is for the surface chemical composition.

Use of XPS for silica-alumina characterization was published by W. Daneiell et al. in Applied Catalysis A, 196, 247-260, 2000. The XPS technique is, therefore, effective in measuring the chemical composition of the outer layer of catalytic particle surface. Other surface measurement techniques, such as Auger electron spectroscopy (AES) and Secondary-ion mass spectroscopy (SIMS), could also be used for measurement of the surface composition.

Separately, the bulk Si/Al ratio of the composition is determined from ICP elemental analysis. Then, by comparing the surface Si/Al ratio to the bulk Si/Al ratio, the S/B ratio and the homogeneity of silica-alumina are determined. How the SB ratio defines the homogeneity of a particle is explained as follows. An S/B ratio of 1.0 means the material is completely homogeneous throughout the particles. An S/B ratio of less than 1.0 means the particle surface is enriched with aluminum (or depleted with silicon), and aluminum is predominantly located on the external surface of the particles. The S/B ratio of more than 1.0 means the particle surface is enriched with silicon (or depleted with aluminum), and aluminum is predominantly located on the internal area of the particles.

"Zeolite USY" refers to ultra-stabilized Y zeolite. Y zeolites are synthetic faujasite (FAU) zeolites having a SAR of 3 or higher, e.g., from 5 up to 15. Y zeolite can be ultra-stabilized by one or more of hydrothermal stabilization, dealumination, and isomorphous substitution. Zeolite USY can be any FAU-type zeolite with a higher framework silicon content than a starting (as-synthesized) Na—Y zeolite precursor. Such suitable Y zeolites are commercially available from, e.g., Zeolyst International, Tosoh Corporation, and JGC Catalyst and Chemicals Ltd. (JGC CC).

As described herein, the hydrocracking catalyst of the present process contains one or more metals, which metals are impregnated into the above described base or support. For each embodiment described herein, each metal employed is selected from the group consisting of elements from Group 6 and Groups 8 through 10 of the Periodic Table, and mixtures thereof. In one embodiment, each metal is selected from the group consisting of nickel (Ni), palladium (Pd), platinum (Pt), cobalt (Co), iron (Fe), chromium (Cr), molybdenum (Mo), tungsten (W), and mixtures thereof. In another embodiment, the hydrocracking catalyst contains at least one Group 6 metal and at least one metal selected from Groups 8 through 10 of the periodic table. Exemplary metal combinations include Ni/Mo/W, Ni/Mo, Ni/W, Co/Mo, Co/W, Co/W/Mo and Ni/Co/W/Mo.

The total amount of metal material in the hydrocracking catalyst is from 0.1 wt. % to 90 wt. % based on the bulk dry weight of the hydrocracking catalyst. In one embodiment, the hydrocracking catalyst contains from 2 wt. % to 10 wt. % of nickel material, e.g., oxide and from 8 wt. % to 40 wt. % of tungsten material, e.g., oxide, based on the bulk dry weight of the hydrocracking catalyst.

A diluent may be employed in the formation of the hydrocracking catalyst. Suitable diluents include inorganic oxides such as aluminum oxide and silicon oxide, titanium oxide, clays, ceria, and zirconia, and mixture of thereof. The amount of diluent in the hydrocracking catalyst is from 0 wt. % to 35 wt. % based on the bulk dry weight of the hydrocracking catalyst. In one embodiment, the amount of diluent in the hydrocracking catalyst is from 0.1 wt. % to 25 wt. % based on the bulk dry weight of the hydrocracking catalyst.

The hydrocracking catalyst of the present invention can also contain one or more promoters selected from the group consisting of phosphorous (P), boron (B), fluorine (F), silicon (Si), aluminum (Al), zinc (Zn), manganese (Mn), and mixtures thereof. The amount of promoter in the hydrocracking catalyst is from 0 wt. % to 10 wt. % based on the bulk dry weight of the hydrocracking catalyst. In one embodiment, the amount of promoter in the hydrocracking catalyst is from 0.1 wt. % to 5 wt. % based on the bulk dry weight of the hydrocracking catalyst.

The present second stage hydrocracking catalyst also comprises an organic acid. An organic acid is an organic compound with acidic properties. The most common acids are the carboxylic acids, whose acidity is associated with their carboxyl groups-COOH. The organic acid can be added in the impregnation solution with the metals. Any suitable organic acid can be used. Examples include lactic acid, acetic acid, formic acid, citric acid, oxalic acid, uric acid, malic acid and/or tartaric acid. A mixture of acids can be used. In one embodiment, citric acid is the organic acid.

Preparation of the Hydrocracking Catalyst for the Second Hydrocracking Stage

In one embodiment, metal deposition is achieved by contacting at least the catalyst support with an impregnation solution. The impregnation solution contains at least one metal salt, such as a metal nitrate or metal carbonate, a solvent, an organic acid, and has a pH between 1 and 5.5, inclusive (1≤pH≤5.5) In one embodiment, a shaped hydrocracking catalyst is prepared by:

(a) forming an extrudable mass containing the catalyst base,
(b) extruding the mass to form a shaped extrudate,
(c) calcining the mass to form a calcined extrudate,
(d) contacting the shaped extrudate with an impregnation solution containing at least one metal salt, solvent, organic acid, and having a pH between 1 and 5.5, inclusive (1≤pH≤5.5) and
(e) drying the impregnated extrudate at a temperature sufficient to remove the impregnation solution solvent, to form a dried impregnated extrudate.

In another embodiment, a shaped hydrocracking catalyst is prepared by:

(a) forming an extrudable mass containing the catalyst base,
(b) extruding the mass to form a shaped extrudate,
(c) calcining the mass to form a calcined extrudate,
(d) contacting the shaped extrudate with an impregnation solution containing at least one metal salt, solvent, and an organic acid, wherein the impregnation solution has a pH between 1 and 5.5, inclusive (1≤pH≤5.5), and
(e) drying the impregnated extrudate at a temperature below the decomposition temperature of the organic acid, but sufficient to remove the impregnation solution solvent to form a dried impregnated extrudate.

In another embodiment, a shaped hydrocracking catalyst is prepared by:

(a) forming an extrudable mass containing the catalyst base,
(b) extruding the mass to form a shaped extrudate,
(c) calcining the mass to form a calcined extrudate,
(d) contacting the shaped extrudate with an impregnation solution containing at least one metal salt, solvent, and an organic acid, wherein the impregnation solution has a pH between 1 and 5.5, inclusive (1≤pH≤5.5),
(e) drying the impregnated extrudate at a temperature below the decomposition temperature of the organic acid, but sufficient to remove the impregnation solution solvent, to form a dried impregnated extrudate, and
(f) calcining the dried impregnated extrudate to convert at least one metal into oxide.

In one embodiment, a mild acid is used in forming the extrudable mass containing the catalyst base. For example, in one embodiment a diluted $HNO_3$ acid aqueous solution with from 0.5 to 5 wt. % $HNO_3$ is used.

In one embodiment, the impregnation solution comprises a metal carbonate. Nickel carbonate is the preferred metal salt for use in the preparation of the present catalyst.

The diluent, promoter and/or molecular sieve (if employed) may be combined with the carrier when forming the extrudable mass. In another embodiment, the carrier and (optionally) the diluent, promoter and/or molecular sieve can be impregnated before or after being formed into the desired shapes.

For each embodiment described herein, the impregnation solution has a pH between 1 and 5.5, inclusive (1≤pH≤5.5). In one embodiment, the impregnation solution has a pH between 1.5 and 3.5, inclusive (1.5≤pH≤3.5).

The impregnation solution must also comprise an organic acid. The presence of an organic acid in combination with the metals and base components has been found to provide a favored selectivity for naphtha products. For each embodiment described herein, the amount of organic acid in the pre-calcined hydrocracking catalyst is 2 wt. % to 18 wt. ^ based on the bulk dry weight of the hydrocracking catalyst.

Depending on the metal salts, organic acid, and other components used to form the impregnation solution, before the addition of a basic component the pH of the impregnation solution will typically have a pH of less than 1, and more typically a pH of about 0.5. By adding a basic component to the impregnation solution to affect a pH adjustment to 1 and 5.5, inclusive (1≤pH≤5.5), the acid concentration is eliminated or reduced to a level which, during calcination, does not acid-catalyze decomposition of the ammonium nitrate at a rate rapid enough to have a deleterious effect on the hydrocracking catalyst. In one embodiment, the acid concentration is eliminated or reduced to a level which, during calcination, does not acid-catalyze decomposition of the ammonium nitrate at a rate rapid enough to have a deleterious effect on more than 10 wt. % of the bulk dry weight of the hydrocracking catalyst (e.g., does not produce fines or fractured extrudates which account for more than 10 wt. % of the bulk dry weight of the post-calcined hydrocracking catalyst).

The basic component can be any base which can dissolve in the solvent selected for the impregnation solution and which is not substantially deleterious to the formation of the catalyst or to the hydrocracking performance of the catalyst, meaning that the base has less than a measureable effect on, or confer less than a material disadvantage to, the performance of the hydrocracking catalyst. A base which is not substantially deleterious to the formation of the catalyst will not reduce catalyst activity by more than 10° F. (5.5° C.) based on the performance of the hydrocracking catalyst without pH correction.

Where the hydrocracking catalyst is to be used in the present hydrocracking process, one suitable base is ammonium hydroxide. Other exemplary bases include potassium hydroxide, sodium hydroxide, calcium hydroxide, and magnesium hydroxide.

The calcination of the extruded mass can vary. Typically, the extruded mass can be calcined at a temperature between 752° F. (400° C.) and 1200° F. (650° C.) for a period of between 1 and 3 hours.

Non-limiting examples of suitable solvents include water and C1 to C3 alcohols. Other suitable solvents can include polar solvents such as alcohols, ethers, and amines. Water is a preferred solvent. It is also preferred that the metal compounds be water soluble and that a solution of each be formed, or a single solution containing both metals be formed. The modifying agent can be prepared in a suitable solvent, preferably water.

The three solvent components can be mixed in any sequence. That is, all three can be blended together at the same time, or they can be sequentially mixed in any order. In an embodiment, it is preferred to first mix the one or more metal components in an aqueous media, than add the modifying agent.

The amount of metal precursors and organic acid in the impregnation solution should be selected to achieve preferred ratios of metal to organic acid in the catalyst precursor after drying.

The calcined extrudate is exposed to the impregnation solution until incipient wetness is achieved, typically for a period of between 1 and 100 hours (more typically between 1 and 5 hours) at room temperature to 212° F. (100° C.) while tumbling the extrudates, following by aging for from 0.1 to 10 hours, typically from about 0.5 to about 5 hours.

The drying step is conducted at a temperature sufficient to remove the impregnation solution solvent, but below the decomposition temperature of the modifying agent. In another embodiment, the dried impregnated extrudate is then calcined at a temperature above the decomposition temperature of the modifying agent, typically from about 500° F. (260° C.) to 1100° F. (590° C.), for an effective amount of time. The present invention contemplates that when the impregnated extrudate is to be calcined, it will undergo drying during the period where the temperature is being elevated or ramped to the intended calcination temperature. This effective amount of time will range from about 0.5 to about 24 hours, typically from about 1 to about 5 hours. The calcination can be carried out in the presence of a flowing oxygen-containing gas such as air, a flowing inert gas such as nitrogen, or a combination of oxygen-containing and inert gases.

In one embodiment, the impregnated extrudate is calcined at a temperature which does not convert the metals to metal oxides. Yet in another embodiment, the impregnated extrudate can be calcined at a temperature sufficient to convert the metals to metal oxides.

The dried and calcined hydrocracking catalysts of the present invention can be sulfided to form an active catalyst. Sulfiding of the catalyst precursor to form the catalyst can be performed prior to introduction of the catalyst into a reactor (thus ex-situ presulfiding), or can be carried out in the reactor (in-situ sulfiding).

Suitable sulfiding agents include elemental sulfur, ammonium sulfide, ammonium polysulfide ([$(NH_4)2S_x$), ammonium thiosulfate ($(NH_4)_2S_2O_3$), sodium thiosulfate ($Na_2S_2O_3$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), aqueous ammonium sulfide.

Generally, the sulfiding agent is present in an amount in excess of the stoichiometric amount required to form the sulfided catalyst. In another embodiment, the amount of sulfiding agent represents a sulphur to metal mole ratio of at least 3 to 1 to produce a sulfided catalyst.

The catalyst is converted into an active sulfided catalyst upon contact with the sulfiding agent at a temperature of 150° F. to 900° F. (66° C. to 482° C.), from 10 minutes to 15 days, and under a $H_2$-containing gas pressure of 101 kPa to 25,000 kPa. If the sulfidation temperature is below the boiling point of the sulfiding agent, the process is generally carried out at atmospheric pressure. Above the boiling temperature of the sulfiding agent/optional components, the reaction is generally carried out at an increased pressure. As used herein, completion of the sulfidation process means that at least 95% of stoichiometric sulfur quantity necessary to convert the metals into for example, $CO_9S_8$, $MoS_2$, $WS_2$, $Ni_3S_2$, etc., has been consumed.

In one embodiment, the sulfiding can be carried out to completion in the gaseous phase with hydrogen and a sulfur-containing compound which is decomposable into $H_2S$. Examples include mercaptanes, $CS_2$, thiophenes, DMS, DMDS and suitable S-containing refinery outlet gasses. The gaseous mixture of $H_2$ and sulfur containing compound can be the same or different in the steps. The sulfidation in the gaseous phase can be done in any suitable manner, including a fixed bed process and a moving bed process (in which the catalyst moves relative to the reactor, e.g., ebullated process and rotary furnace).

The contacting between the catalyst precursor with hydrogen and a sulfur-containing compound can be done in one step at a temperature of 68° F. to 700° F. (20° C. to 371° C.) at a pressure of 101 kPa to 25,000 kPa for a period of 1 to 100 hrs. Typically, sulfidation is carried out over a period of time with the temperature being increased or ramped in increments and held over a period of time until completion.

In another embodiment sulfidation can be in the gaseous phase. The sulfidation is done in two or more steps, with the first step being at a lower temperature than the subsequent step(s).

In one embodiment, the sulfidation is carried out in the liquid phase. At first, the catalyst precursor is brought in contact with an organic liquid in an amount in the range of 20% to 500% of the catalyst total pore volume. The contacting with the organic liquid can be at a temperature ranging from ambient to 248° F. (120° C.). After the incorporation of an organic liquid, the catalyst precursor is brought into contact with hydrogen and a sulfur-containing compound.

In one embodiment, the organic liquid has a boiling range of 200° F. to 1200° F. (93° C. to 649° C.). Exemplary organic liquids include petroleum fractions such as heavy oils, lubricating oil fractions like mineral lube oil, atmospheric gas oils, vacuum gas oils, straight run gas oils, white spirit, middle distillates like diesel, jet fuel and heating oil, naphtha, and gasoline. In one embodiment, the organic liquid contains less than 10 wt. % sulfur, and preferably less than 5 wt. %.

The present catalyst is deployed in the second stage of a two-stage hydrocracking unit, with or without intermediate stage separation, and with or without recycle. Two-stage hydrocracking units can be operated using a full conversion configuration (meaning all of the hydrotreating and hydrocracking is accomplished within the hydrocracking loop via recycle). This embodiment may employ one or more distillation units within the hydrocracking loop for the purpose of stripping off product prior to the second stage hydrocracking step or prior to recycle of the distillation bottoms back to the first and/or second stage.

Two stage hydrocracking units can also be operated in a partial conversion configuration (meaning one or more distillation units are positioned within hydrocracking loop for the purpose of stripping of one or more streams that are passed on for further hydroprocessing). Operation of the hydrocracking unit in this manner allows a refinery to hydroprocess highly disadvantaged feedstocks by allowing undesirable feed components such as the polynuclear aromatics, nitrogen and sulfur species (which can deactivate hydrocracking catalysts) to pass out of the hydrocracking loop for processing by equipment better suited for processing these components, e.g., an FCC unit.

Two stage hydrocracking units can also be operated in a partial conversion configuration (meaning one or more distillation units are positioned within hydrocracking loop for the purpose of stripping of one or more streams that are passed on for further hydroprocessing). Operation of the hydrocracking unit in this manner allows a refinery to withdraw desirable product components such as waxy base oils to pass out of the hydrocracking loop for processing by equipment better suited for processing these components, e.g., isomerization units to produce high value base oil.

The hydrocracking conditions generally include a temperature in the range of from 175° C. to 485° C., molar ratios of hydrogen to hydrocarbon charge from 1 to 100, a pressure in the range of from 0.5 to 350 bar, and a liquid hourly space velocity (LHSV) in the range of from 0.1 to 30.

The use of the present catalyst as a catalyst in a second hydrocracking stage results in much improved selectivity and yield of desirable naphtha products relative to the use of more traditional second hydrocracking stage catalysts. For example, the present process using the present catalyst in the second stage can provide a selectivity in naphtha products having a boiling point in the range of from 180-347° F. (82-175° C.) of at least 50 wt. %. In another embodiment, the selectivity realized can be at least 60 wt. %. Such an improvement in naphtha products is significant and will help provide the naphtha products the industry presently demands.

Example 1

A commercial comparable hydrocracking catalyst was prepared per the following procedure:

(1) 44.0 parts by weight pseudo boehmite alumina powder (obtained from Sasol), 56.0 parts by weight of zeolite Y (from Zeolyst JGC, Tosoh) were mixed well.
(2) A diluted HNO3 acid aqueous solution (3 wt. %) was added to the mix powder to form an extrudable paste.
(3) The paste was extruded in 1/16" asymmetric quadrilobe shape, and dried at 250° F. (121° C.) overnight.
(4) The dried extrudates were calcined at 1100° F. (593° C.) for 1 hour with purging excess dry air, and cooled down to room temperature.
(5) Impregnation of Ni and Mo was done using a solution made from molybdenum oxide, nickel carbonate, and phosphorus acid to the target metal loadings of 3.6 wt. % NiO and 18.0 wt. % MoO3 in bulk dry weight of the finished catalyst. The catalyst was dried at 212° F. (100° C.) for 2 h and calcined at 950° F. (510° C.) for 1 h. This catalyst is referred to as "Commercial Competitive Catalyst" in the following examples.

Example 2

An exemplary base (for Catalyst Sample A) of the present process is prepared in the following way:

(1) 22.6 parts by weight pseudo boehmite alumina powder (obtained from Sasol), 21.0 parts by weight of silica alumina powder, 56.0 parts by weight of zeolite Y (from Zeolyst JGC, Tosoh) were mixed well.
(2) A diluted HNO3 acid aqueous solution (3 wt. %) was added to the mix powder to form an extrudable paste.
(3) The paste was extruded in 1/16" asymmetric quadrilobe shape, and dried at 250° F. (121° C.) overnight.
(4) The dried extrudates were calcined at 1100° F. (593° C.) for 1 hour with purging excess dry air, and cooled down to room temperature.

Impregnation of Ni and W was done using a solution made from ammonium metatungstate and nickel carbonate in concentration equal to the target metal loadings of 3.6 wt. % NiO and 18.0 wt. % MoO3 in bulk dry weight of the finished catalyst. Citric acid, in an amount equal to 10 wt % of the bulk dry weight of the finished catalyst, was added to the NiW solution. The solution was heated to above 120° F. (49° C.) to ensure a clear solution. The metal solution was added to the base extrudates gradually while tumbling the extrudates. When the solution addition was completed, the soaked extrudates were aged at room temperature for at least 2 hours. Then the extrudates were dried at 400° F. (205° C.) for 2 hours with purging excess dry air, and then cooled down to room temperature.

Example 3

Table 1 below shows the chemical composition and pore size distribution (PSD) comparison between the present catalyst Sample A and the Commercial Comparative Catalyst. The present catalyst Sample A (a NiW catalyst) is about 10 wt. % less dense than the Comparative Catalyst (a NiMo catalyst). The present catalyst Sample A contains ASA and an organic acid (citric acid), but the Comparative Catalyst does not.

The Sample A catalyst and the Comparative Catalyst were tested under the following Single Stage Recycle (SSREC) HCR test protocol:

Total pressure=2000 psig
Recycle $H_2$/Oil=5000 SCFB
Liquid Hourly Space Velocity (LHSV)=1.0 $h^{-1}$ or 1.5 $h^{-1}$
Per Pass Conversion (PPC): 70 vol. %
Recycle Cut Point (RCP): 347° F. or 384° F.
Feedstock: A clean vacuum gas oil (VGO), e.g., an unconverted oil (UCO) derived from the first stage hydrocracking process.

The feed properties of the clean VGO feed are shown in Table 2. The UCO's end boiling point is 1080° F. and it contains ppm levels of 6+ ring heavy polynuclear aromatics (HPNA) compounds.

The product yield structures between ICR 215 and Sample A with LHSV=1.0 $h^{-1}$, RCP=384° F., and PPC=~70 vol. % with bleed rate of ~6 vol. % are compared in Table 3.

TABLE 1

Chemical composition and physical properties of Sample A and ICR 215

| Catalyst Sample | Commercial Competitive Catalyst | Sample A |
|---|---|---|
| Base composition | 43.6 wt. % Alumina + 56.4 wt. % USY | 22.6 wt. % Alumina + 21 wt. % Silica Alumina + 56.4 wt. % USY |
| Weight loss at 500° C., wt. % | 9.5 | 14.5 |
| Particle Density, g/mL | 1.32 | 1.25 |
| Dry bulk density, g/mL | 0.773 | 0.694 |
| $N_2$ specific surface area, $m^2/g$ | 335 | 369 |
| $N_2$ Pore volume, mL/g | 0.358 | 0.340 |
| Chemical composition, wt. % | | |
| $Al_2O_3$ | 36.80 | 28.97 |
| $SiO_2$ | 38.71 | 41.72 |
| $MoO_3$ | 17.84 | 0.40 |
| $WO_3$ | 0.00 | 24.44 |
| NiO | 3.69 | 4.47 |
| $P_2O_5$ | 2.96 | 0.00 |

TABLE 2

Feed properties of the clean VGO feed

| Feedstock | Clean VGO |
|---|---|
| API | 31.0 |
| S, ppm | 20.2 |
| N, ppm | 1.22 |
| H wt. % by NMR | 13.75 |
| Hydrocarbon types by MS, vol. % | |
| paraffins | 22.4 |
| Naphthenes | 64.5 |
| Aromatics | 13.1 |
| 6+ ring HPNA by HPLC, ppm | |
| Benzoperylene | 33.0 |
| Alkyl Benzoperylene | 38.4 |
| Coronene | 5.0 |
| Alkyl coronene | 5.3 |
| Ovalene | 0.0 |
| Alkyl ovalene | 0.0 |
| Simdist (wt. %), ° F. | |
| 0.5 | 514 |
| 5 | 637 |
| 30 | 770 |
| 50 | 825 |
| 70 | 890 |
| 90 | 987 |
| 95 | 1035 |
| EP | 1080 |

TABLE 3

Product yield structure comparison between the Commercial Comparative Catalyst and Sample A with RCP = 384° F. (196° C.) and PPC = ~70 vol. %

| Catalyst | Commercial Comparative Catalyst | Sample A |
|---|---|---|
| Reactor Temp, ° F. | 617 | 568 |
| Overall LHSV, $h^{-1}$ | 1.01 | 1.01 |
| Fresh LHSV, $h^{-1}$ | 0.74 | 0.75 |
| PPC, vol % | 69.72 | 69.93 |
| Pressure, psig | 1995 | 2016 |
| $H_2$ Partial Pressure, psia | 1742 | 1810 |

TABLE 3-continued

Product yield structure comparison between the Commercial Comparative Catalyst and Sample A with RCP = 384° F. (196° C.) and PPC = ~70 vol. %

| Catalyst | Commercial Comparative Catalyst | Sample A |
|---|---|---|
| Gas-In, SCF/B | 6129 | 5951 |
| Recycle Gas, SCF/B | 5021 | 4959 |
| Product Yield, wt. % | | |
| $C_1$ | 0.01 | 0 |
| $C_2$ | 0.17 | 0.03 |
| $C_3$ | 4.07 | 1.37 |
| $iC_4$ | 13.65 | 6.13 |
| $nC_4$ | 3.87 | 1.14 |
| $C_5$-180° F. | 32.49 | 22.16 |
| 180-347° F. (82-175° C.) | 40.94 | 60.37 |
| 347° F.-RCP | 1.28 | 5.82 |
| RCP (° F.) | 384 | 384 |
| Total $C_4$− | 21.78 | 8.67 |
| Total $C_5$+ | 80.72 | 93.52 |
| $H_2$ Consumption, SCF/B | 1432 | 1257 |

Sample A was 49° F. (27.2° C.) more active than the Commercial Comparative Catalyst in this case. Sample A was more heavy naphtha selective than the Comparative Catalyst, ~19 wt. % more 180-347° F. (82-175° C.) yield, an increase of greater than 47%; and, 5.5 wt. % more 347-384° F. (175-196° C.) yield, an increase of greater than 3 times. Furthermore, the C4-gas yield, C5-180° F. liquid yield and $H_2$ consumption was lower on Sample A.

Table 4 compares product properties between the Commercial Comparative Catalyst and Sample A with RCP=384° F. and PPC=70 vol %. The recycle bottom oil (RBO) products (384+° F.) on Sample A Simdist T5-T90s were all significantly lower than that of Comparative Catalyst, indicating ASA in Sample A cracked the heavy ends of the feed (Clean VGO). The RBO product on Sample A contained less naphthene and aromatic compounds but more paraffin content, indicating Sample A was stronger in hydrogenation and cracking naphthene rings. The amount of 6+ ring HPNA of the RBO products from Sample A is much less that of the Comparative Catalyst, indicating Sample A will be having a much longer life in the refiner than the Comparative Catalyst.

TABLE 4

Product property comparison between the Commercial Comparative Catalyst and Sample A with RCP = 384° F. (196° C.) and PPC = ~70 vol. %

| Catalyst | Commercial Comparative Catalyst | | Sample A | |
|---|---|---|---|---|
| RCP, ° F. | 384 | | 384 | |
| LHSV, $h^{-1}$ | 1 | | 1 | |
| PPC, vol. % | 69.72 | | 69.93 | |
| Product type | Naphtha | RBO | Naphtha | RBO |
| API | 67.6 | 26.8 | 65.4 | 35.5 |
| Hydrocarbon types by GC, wt. % | | | | |
| i-Paraffin | 55.25 | | 52.5 | |
| n-Paraffin | 6.78 | | 8.51 | |
| Olefin | 0 | | 0 | |
| Naphthene | 33.79 | | 32.79 | |
| Aromatics | 3.17 | | 3.17 | |
| Unclassified HC | 1 | | 3.08 | |
| 6+ ring HPNA by HPLC, ppm | | | | |
| Benzoperylene | | 21 | | 1.1 |
| Alkyl Benzoperylene | | 65 | | 0.3 |
| Coronene | | 86 | | 32.5 |

TABLE 4-continued

Product property comparison between the Commercial Comparative Catalyst and Sample A with RCP = 384° F. (196° C.) and PPC = ~70 vol. %

| Catalyst | Commercial Comparative Catalyst | | Sample A | |
|---|---|---|---|---|
| Alkyl Coronene | | 0 | | 9.2 |
| Ovalene | | 0 | | 0 |
| Alkyl Ovalene | | | | 0 |
| Hydrocarbon types by Mass Spec, vol. % | | | | |
| Paraffin | | 3.6 | | 39.6 |
| Naphthene | | 88.7 | | 56.4 |
| Aromatics | | 7.7 | | 4 |
| H wt. % by NMR | 14.92 | 13.39 | 15.17 | 13.93 |
| Simdist (wt. %), ° F. | | | | |
| 0.5 | 29 | 332 | −7 | 310 |
| 5 | 74 | 619 | 74 | 377 |
| 10 | 77 | 722 | 131 | 397 |
| 15 | 135 | 764 | 138 | 420 |
| 20 | 137 | 794 | 157 | 438 |
| 25 | 144 | 817 | 191 | 464 |
| 30 | 165 | 838 | 196 | 508 |
| 35 | 169 | 858 | 200 | 575 |
| 40 | 192 | 876 | 217 | 678 |
| 50 | 199 | 908 | 244 | 791 |
| 55 | 215 | 924 | 247 | 827 |
| 60 | 222 | 938 | 258 | 860 |
| 65 | 238 | 952 | 273 | 888 |
| 70 | 245 | 967 | 284 | 915 |
| 75 | 251 | 982 | 292 | 939 |
| 80 | 269 | 997 | 304 | 964 |
| 85 | 280 | 1013 | 321 | 988 |
| 90 | 291 | 1032 | 334 | 1013 |
| 95 | 318 | 1057 | 357 | 1046 |
| 99 | 362 | 1100 | 380 | 1096 |
| EP | 375 | 1118 | 387 | 1116 |

The product yield structures and properties between Commercial Comparative Catalyst and sample A with LHSV=1.5 $h^{-1}$, RCP=347° F. (175° C.), and PPC=~75 vol. % with bleed rate of ~5 vol. % are compared in Tables 5 and 6 below, respectively.

The yield result comparison on the two catalysts with RCP=347° F. (175° C.) from Table 5 followed the same trend as what was observed with RCP=384° F. (196° C.) from Table 3, Sample A was more active and heavy naphtha selective than the Commercial Comparative Catalyst.

The product property comparison on the two catalysts with RCP=347° F. (175° C.) from Table 6 followed the same trend as that with RCP=384° F. (196° C.) from Table 4. RBO products (347+° F.) on Sample A's Simdist T50 is lower than that of Comparative Catalyst. It contains less naphthene and aromatic compounds but more paraffin content. The amount of 6+ ring HPNA of it is less that of the Comparative Catalyst.

TABLE 5

Product yield structure comparison between the Commercial Comparative Catalyst and sample A with RCP = 347° F. (175° C.) and PPC = ~75 vol. %

| Catalyst | Commercial Comparative Catalyst | Sample A |
|---|---|---|
| Reactor Temp, ° F. | 630 | 597 |
| Total LHSV, $h^{-1}$ | 1.49 | 1.49 |
| Fresh LHSV, $h^{-1}$ | 1.18 | 1.2 |
| PPC, vol. % | 75.19 | 76.21 |
| Pressure, psig | 2003 | 1991 |

TABLE 5-continued

Product yield structure comparison between the Commercial Comparative Catalyst and sample A with RCP = 347° F. (175° C.) and PPC = ~75 vol. %

| Catalyst | Commercial Comparative Catalyst | Sample A |
|---|---|---|
| $H_2$ Partial Pressure, psia | 1747 | 1752 |
| Gas-In, SCF/B | 6200 | 6135 |
| Recycle Gas, SCF/B | 5056 | 5035 |
| Product Yield, wt. % | | |
| $C_1$ | 0.01 | 0.01 |
| $C_2$ | 0.16 | 0.05 |
| $C_3$ | 3.77 | 1.98 |
| $iC_4$ | 13.5 | 8.88 |
| $nC_4$ | 3.91 | 1.86 |
| $C_5$-180° F. | 32.48 | 25.19 |
| 180° F.-RCP | 43.25 | 59.25 |
| RCP, ° F. | 347 | 347 |
| Total $C_4$− | 21.35 | 12.78 |
| Total $C_5$+ | 81.03 | 89.51 |
| $H_2$ Consumption, SCF/B | 1363 | 1316 |

TABLE 6

Product property comparison between Comparative Catalyst and Sample A with RCP = 347° F. (175° C.) and PPC = 70 vol. %

| Catalyst | Commercial Comparative Catalyst | | Sample A | |
|---|---|---|---|---|
| RCP, ° F. | 347 | | 347 | |
| LHSV, $h^{-1}$ | 1.5 | | 1.5 | |
| PPC, vol. % | 74.03 | | 76.21 | |
| Product type | Naphtha | RBO | Naphtha | RBO |
| API | 67.8 | 28.6 | 66.9 | 39.1 |
| Hydrocarbon types by GC, wt. % | | | | |
| i-Paraffin | 58.29 | | 55.8 | |
| n-Paraffin | 7.09 | | 9.46 | |
| Olefin | 0.01 | | 0 | |
| Naphthene | 30.45 | | 30.79 | |
| Aromatics | 3.16 | | 2.07 | |
| Unclassified HC | 0.99 | | 1.87 | |
| 6+ ring HPNA by HPLC, ppm | | | | |
| Benzoperylene | | 68 | | 1.7 |
| Alkyl Benzoperylene | | 172 | | 0 |
| Coronene | | 88 | | 34 |
| Alkyl coronene | | 116 | | 7.9 |
| Ovalene | | 0 | | 0 |
| Alkyl ovalene | | 0 | | 0 |
| Hydrocarbon types by Mass Spec, vol. % | | | | |
| Paraffins | | 10.3 | | 59.7 |
| Naphthenes | | 79.7 | | 36.2 |
| Aromatics | | 10 | | 4.1 |
| H wt. % by NMR | 15.19 | 13.4 | 15.19 | 14.32 |
| Simdist (wt. %), ° F. | | | | |
| 0.05 | 30 | 331 | −7 | 331 |
| 5 | 77 | 360 | 4 | 344 |
| 10 | 79 | 400 | 96 | 353 |
| 15 | 136 | 612 | 136 | 361 |
| 20 | 139 | 717 | 144 | 366 |
| 25 | 145 | 762 | 167 | 377 |
| 30 | 156 | 793 | 191 | 388 |
| 35 | 169 | 819 | 195 | 404 |
| 40 | 192 | 841 | 199 | 425 |
| 50 | 199 | 882 | 223 | 492 |
| 55 | 209 | 900 | 242 | 624 |
| 60 | 220 | 918 | 246 | 752 |
| 65 | 235 | 935 | 249 | 817 |
| 70 | 246 | 951 | 260 | 866 |
| 75 | 249 | 969 | 276 | 905 |
| 80 | 261 | 986 | 288 | 939 |
| 85 | 278 | 1004 | 294 | 971 |
| 90 | 290 | 1025 | 312 | 1002 |
| 95 | 306 | 1052 | 329 | 1039 |
| 99 | 335 | 1095 | 346 | 1095 |
| EP | 347 | 1112 | 354 | 1124 |

Table 5's product yield structure was arranged as a different type of yield structure with C1 to C12 molecules as shown in Table 7. It is clear that sample A produced more C9 to C12 molecules than the commercial competitive catalyst.

TABLE 7

Product $C_1$ to $C_{12}$ yield structure comparison between the Commercial Comparative Catalyst and Sample A with RCP = 347° F. (175° C.) and PPC = ~75 vol. %

| Catalyst | Commercial Comparative Catalyst | Sample A |
|---|---|---|
| Reactor Temp, ° F. | 630 | 597 |
| Overall LHSV, $h^{-1}$ | 1.49 | 1.49 |
| Fresh LHSV, $h^{-1}$ | 1.18 | 1.2 |

TABLE 7-continued

Product $C_1$ to $C_{12}$ yield structure comparison between the Commercial Comparative Catalyst and Sample A with RCP = 347° F. (175° C.) and PPC = ~75 vol. %

| Catalyst | Commercial Comparative Catalyst | Sample A |
|---|---|---|
| PPC, vol. % | 75.19 | 76.21 |
| Pressure, psig | 2003 | 1991 |
| $H_2$ Partial Pressure, psia | 1747 | 1752 |
| Gas-In, SCF/B | 6200 | 6135 |
| Recycle Gas, SCF/B | 5056 | 5035 |
| Product Yield, wt. % | | |
| $C_1$ | 0.01 | 0.01 |
| $C_2$ | 0.16 | 0.05 |

TABLE 7-continued

Product $C_1$ to $C_{12}$ yield structure comparison between the Commercial Comparative Catalyst and Sample A with RCP = 347° F. (175° C.) and PPC = ~75 vol. %

| Catalyst | Commercial Comparative Catalyst | Sample A |
|---|---|---|
| $C_3$ | 3.77 | 1.98 |
| $iC_4$ | 13.5 | 8.88 |
| $nC_4$ | 3.91 | 1.86 |
| $C_5$ | 15.46 | 11.67 |
| $C_6$ | 17.15 | 14.41 |
| $C_7$ | 17.16 | 17.77 |
| $C_8$ | 14.26 | 17.77 |
| $C_9$ | 8.91 | 15.46 |
| $C_{10}$ | 2.54 | 6.61 |
| $C_{11}$ | 0.2 | 0.49 |
| $C_{12}$+ | 0.05 | 0.26 |
| Recycle Bleed, vol. % | 5.07 | 5.07 |
| RCP, ° F. | 347 | 347 |
| TOTAL $C_4$- | 21.35 | 12.78 |
| TOTAL $C_5$+ | 81.03 | 89.51 |
| $H_2$ Consumption, SCF/B | 1363 | 1316 |

To conclude, the present catalyst, Sample A, is a more active, heavy naphtha selective second stage hydrocracking catalyst than the Commercial Comparative Catalyst often used in second stage hydrocracking, with less $H_2$ consumption. The C9 yield is at least 12 wt. %, and even at least 15 wt. %, as shown. The C10 yield is at least 4 wt. %, and even at least 6 wt. %, as shown. These are far greater than that obtained using the Commercial Comparative Catalyst. The recycle bottom product from Sample A also contains less naphthene and aromatic compounds, especially less 6+ ring HPNAs, which enables Sample A to be a longer life hydrocracker catalyst for commercial application. The recycle bottom product's T50 is also much lower than that from the Comparative Catalyst.

The foregoing description of one or more embodiments of the invention is primarily for illustrative purposes, it being recognized that variations might be used which would still incorporate the essence of the invention. Although illustrative embodiments of one or more aspects are provided herein, the disclosed processes and catalysts may be implemented using any number of techniques. The disclosure is not limited to the illustrative or specific embodiments, drawings, and techniques illustrated herein, including any exemplary designs and embodiments illustrated and described herein, and may be modified within the scope of the appended claims along with their full scope of equivalents.

For the purposes of U.S. patent practice, and in other patent offices where permitted, all patents and publications cited in the foregoing description of the invention are incorporated herein by reference to the extent that any information contained therein is consistent with and/or supplements the foregoing disclosure.

What is claimed is:

1. A two stage hydrocracking process comprising:

a) hydrocracking a hydrocarbon feed in a first hydrocracking stage under hydrocracking conditions; and b) passing an effluent from the first hydrocracking stage to a second hydrocracking stage wherein the effluent is hydrocracked under hydrocracking conditions, with the catalyst in the second hydrocracking stage having a catalyst support base consisting of alumina, an amorphous silica-alumina (ASA), and a USY zeolite, wherein the base is impregnated with at least one Group 6 and at least one Group 8-10 metal, and an organic acid; and wherein the catalyst in the second hydrocracking stage is prepared by:

(a) forming an extrudable mass containing the catalyst support base, (b) extruding the mass to form a shaped extrudate, (c) calcining the mass to form a calcined extrudate, (d) preparing an impregnation solution containing at least one metal nitrate or metal carbonate, an organic acid and an ammonium containing component, and adjusting the pH of the impregnation solution to between 1 and 5.5 with a hydroxide base, inclusive, (e) contacting the shaped extrudate with the impregnation solution, and (f) drying the impregnated extrudate at a temperature sufficient to remove the impregnation solution solvent, and to form a dried impregnated extrudate.

2. The process of claim 1, wherein the base is 0.1 to 40 wt. % alumina, 0.1 to 40 wt. % ASA, and 20 to 85 wt. % USY zeolite.

3. The process of claim 2, wherein the amount of alumina ranges from about 20 to about 30 wt. %.

4. The process of claim 2, wherein the amount of ASA ranges from about 15 to about 30 wt. %.

5. The process of claim 2, wherein the amount of USY zeolite ranges from about 30 to about 60 wt. %.

6. The process of claim 1, wherein the hydrocracking process produces at least 50 wt. % naphtha products having a boiling point in the range of 180-347° F. (82-175° C.).

7. The process of claim 6, wherein the process produces at least 60 wt. % of the naphtha products.

8. The process of claim 6, wherein at RCP=347° F. (175° C.), $C_9$ yield is at least 12 wt. % and $C_{10}$ yield is at least 4 wt. %.

9. The process of claim 1, wherein effluent from the second hydrocracking stage comprises unconverted oil which is recycled back to the second hydrocracking stage, as recycled bottom oil (RBO).

10. The process of claim 9, wherein the paraffin content measured by mass spectrometry is at least 30 vol. % in the RBO.

11. The process of claim 9, wherein the H content measured by H NMR is at least 13.5 wt. % in the RBO.

12. The process of claim 1, wherein the metals nickel (Ni) and tungsten (W) are impregnated into the base, and the organic acid is citric acid.

13. The process of claim 12, wherein the impregnated metals are from about 2 to about 10 wt. % of nickel salt and from about 8 to about 40 wt. % of tungsten salt based on the bulk dry weight of the hydrocracking catalyst.

14. The process of claim 1, wherein the organic acid is citric acid.

15. The process of claim 1, wherein the impregnation solution comprises nickel carbonate and citric acid.

16. A process of preparing a second stage hydrocracking catalyst having a catalyst support base consisting of alumina, an amorphous silica-alumina (ASA), and a USY zeolite, wherein the base is impregnated with at least one Group 6 metal and at least one Group 8-10 metal, and an organic acid;

wherein the second stage hydrocracking catalyst is prepared by:

(a) forming an extrudable mass containing the catalyst support base, (b) extruding the mass to form a shaped extrudate, (c) calcining the mass to form a calcined extrudate, (d) preparing an impregnation solution containing at least one metal nitrate or metal carbonate, an organic acid and an ammonium containing component, and adjusting the pH of the impregnation solution to between 1 and 5.5 with a hydroxide base, inclusive, (e) contacting the shaped extrudate with the impregnation solution, and (f) drying the impregnated extrudate at a temperature sufficient to remove the impregnation solution solvent, and to form a dried impregnated extrudate.

17. The process of claim 16, wherein the base is 0.1 to 40 wt. % alumina, 0.1 to 40 wt. % ASA, and 20 to 85 wt. % USY zeolite.

18. The process of claim 17, wherein the amount of alumina ranges from about 20 to about 30 wt. %.

19. The process of claim 17, wherein the amount of ASA ranges from about 15 to about 30 wt. %.

20. The process of claim 17, wherein the amount of USY zeolite ranges from about 30 to 60 wt. %.

21. The process of claim 16, wherein the metals nickel (Ni) and tungsten (W) are impregnated into the base.

22. The process of claim 21, wherein the impregnated metals are from about 2 to 10 wt. % of nickel salt and from about 8 to 40 wt. % of tungsten salt based on the bulk dry weight of the second stage hydrocracking catalyst.

23. The process of claim 16, wherein the organic acid is citric acid.

* * * * *